United States Patent [19]

Greensmith et al.

[11] 4,435,510

[45] Mar. 6, 1984

[54] PROTECTION OF GRAPHITE ELECTRODES

[75] Inventors: Dennis Greensmith, Tamworth; Roderic H. Hammerton, Bednall; Colin J. Wall, Birmingham, all of England; Dietger Dunkelmann, Bocholt, Fed. Rep. of Germany; Helmut Jaunich, Raesfeld, Fed. Rep. of Germany; Josef Schiffarth, Bocholt-Barlo, Fed. Rep. of Germany

[73] Assignee: Foseco Trading A.G., Chur, Switzerland

[21] Appl. No.: 404,906

[22] Filed: Aug. 3, 1982

[30] Foreign Application Priority Data

Mar. 20, 1982 [GB] United Kingdom ................. 8208226

[51] Int. Cl.$^3$ .............................................. C03C 5/00
[52] U.S. Cl. ...................................... 501/90; 501/96; 501/99
[58] Field of Search ...................... 501/19, 32, 49, 87, 501/94; 428/408

[56] References Cited

U.S. PATENT DOCUMENTS

| 1,742,259 | 1/1930 | Kelleher | 13/18 R |
| 3,479,137 | 11/1969 | Campbell et al. | 501/49 |
| 4,119,573 | 10/1978 | Ishida et al. | 501/49 |

FOREIGN PATENT DOCUMENTS

| 760623 | 11/1956 | United Kingdom | 13/18 R |
| 1386611 | 3/1975 | United Kingdom | 13/18 R |
| 1375553 | 11/1975 | United Kingdom | 13/18 R |
| 1431891 | 4/1976 | United Kingdom | 13/18 R |

*Primary Examiner*—James Poer
*Attorney, Agent, or Firm*—Cushman, Darby & Cushman

[57] ABSTRACT

Matter for protecting graphite electrodes of electric arc furnaces, e.g. for steelmaking, to reduce loss of graphite by oxidation, comprises particles containing both a graphite-wetting fusible matrix material and a refractory filler. Methods of making and using the particulate matter are disclosed.

11 Claims, No Drawings

PROTECTION OF GRAPHITE ELECTRODES

The invention concerns protection of graphite electrodes from oxidation, material for this purpose and the production of such material.

Graphite electrodes are used in the electric arc steelmaking process and during the process substantial loss of graphite from the electrodes occurs not only from the tip of the electrode i.e. in the arc zone but also to a considerable extent from the side of the electrode by oxidation.

British Patent Specification No. 1386611 describes applying a powder mixture to a hot graphite electrode to form a protective coating. The powder mixture comprises a graphite-wetting matrix material having a melting point below (1000° C. and a refractory filler. The matrix material fuses on the hot electrode to form an adherent continuous coating and the protection provided by this coating is enhanced by the additional presence of the refractory filler in the coating. The filler has the important property of increasing the viscosity of the fused matrix material so that the coating does not drip off the electrode in use and yet the coating retains a degree of fluidity/plasticity over a wide temperature range thereby enabling it to survive substantial temperature fluctuations without cracking.

The application of powder mixture to graphite electrodes to form a protective coating poses a number of problems. For example, the ingredients of powder mixtures generally tend to segregate thereby making it difficult to contact a hot graphite electrode with a uniform powder mixture to form a suitable protective coating. The problems associated with the use of powder mixtures to protect graphite electrodes are avoided by a subsequently developed process involving applying to a hot graphite electrode preformed boards of material, comprising graphite-wetting fusible material, to form a protective coating. This process is described in British Patent Specification No. 1431891 and is in use in a number of countries.

According to the present invention a method of protecting a graphite electrode comprises contacting the electrode with particulate matter, comprising particles each containing both a graphite-wetting fusible matrix material and a refractory filler, whilst the electrode is at an elevated temperature such That the matrix material fuses at least partially and a protective coating comprising the refractory filler in a matrix of the matrix material is formed on the electrode.

As the particulate matter used in the above method comprises particles in which both the essential ingredients are present, the ingredients of these particles do not tend to segregate. Preferably at least 70%, more preferably at least 90%, by weight of the particulate matter is in the form of particles comprising both the essential ingredients. If separate particles of a graphite-wetting fusible matrix material and of a refractory filler are applied to a hot graphite electrode, there is a marked tendency for the refractory filler, which does not have latent adhesive properties, to fail to adhere and thus the composition of the resultant coating does not correspond to that of the material applied and the degree of protection is reduced and some of the refractory filler wasted. These disadvantages are minimised by the method of the invention by virtue of the fact that some or all the refractory filler is present in the form of particles also containing the matrix material and the matrix material is able to fuse at least partially, and thus adhere and serve as an adhesive for the refractory filler, on contact with the hot electrode.

Suitable matrix materials and refractory fillers generally have substantially different densities and thus powder mixtures of separate particles of these substances have a tendency to segregate as a result of the density difference. Also, it may be difficult to obtain a suitable refractory filler having particle sizes similar to the particle sizes desired for the matrix material in a powder mixture and thus segregation may occur as a result of the different paticle sizes. In contrast, in the case of the present invention, the above causes of segregation can be minimised in that particles comprising both the essential ingredients and having narrow ranges of density and particle size can be obtained.

In the method of the invention the particulate matter is applied only to that part of the electrode which, in use, is beneath the clamp used to supply the electric current to the electrode. The particulate matter is applied to the electrode whilst the surface of the electrode is at a sufficiently high temperature to cause at least partial fusion of the matrix material. The necessary temperature is preferably achieved by virtue of the use of the electrode, e.g. in an electric arc steel-making furnace, the method of the invention being particularly valuable for protection of electrodes for this purpose. The particulate matter can conveniently be applied to a hot electrode that has been removed from a furnace after a period of use. Alternatively, for convenience of furnace operation, the particulate matter can be applied to a hot electrode in position at the furnace.

During use of the electrode, graphite is inevitably lost from the tip of the electrode and this is compensated for by lowering the electrode further into the furnace, correspondingly moving the clamp further up the electrode and periodically joining a new length of electrode to the top of the existing electrode. If the repositioning of the clamp and lowering of the electrode is carried out whilst the electrode remains in the furnace, the part of the electrode below the new position of the clamp can then be coated as before. Likewise, at any time when a hot electrode is removed from the furnace, a further coating can be applied and, if the clamp is repositioned at that time, a previously uncoated part of the electrode can then be coated.

The contacting of the hot electrode with the particulate matter can be achieved in various ways. Preferably the particulate matter is either mechanically conveyed to the electrode without the use of a carrier gas stream or the particulate matter is fed to a chamber where it is entrained in a carrier gas to form a stream having a high ratio of solids to carrier gas and the stream is then conveyed to the electrode. In the case of the procedure using a carrier gas it is preferred that the proportion of solids in the stream should be as high as is compatible with conveniently conveying the stream to the electrode as this reduces any tendency for the particles to rebound from the electrode. The method of the present invention does not require the relatively complicated application apparatus needed for the method described in British Patent Specification No. 1431891 mentioned above nor does it have that method's limitation of requiring, in practice, preformed protection boards of different shapes and/or sizes for use with electrodes of different diameters. Moreover whereas the method of Specification No. 1431891 in practice generally requires removal of the electrode from the furnace the method of the present invention can be effected either with the electrode at the furnace, thereby giving operational benefits, or with the electrode removed from the furnace.

According to a further aspect of the present invention, particulate matter for the protection of graphite electrodes comprises particles each containing both a graphite-wetting material having a melting point below 1000° C. and a refractory filler.

The graphite-wetting material is preferably a boron compound or a boron-containing glass. Preferably the graphite-wetting material fuses at relatively low temperatures but is not unduly volatile at rather higher temperatures. A wide variety of refractory fillers are suitable, especially refractory metals, oxides, aluminosilicates, carbides, nitrides, silicides or borides, such as chromic oxide, magnesium oxide, zirconium oxide, titanium oxide, silica, alumina, silicon carbide, tungsten carbide, boron carbide, boron nitride, silicon nitride, titanium boride, zirconium boride and zirconium carbide.

The particulate matter preferably contains 30 to 80%, more preferably 55 to 70%, by weight of refractory filler end 20 to 70%, more preferably 30 to 45%, by weight of graphite-wetting material. If the method is to be conducted when the electrode is very hot the percentage of the refractory filler is preferably in the upper part of the range whilst if it is rather less hot this percentage is preferably in the lower part of the range.

Preferably the maximum particle size of the particles of the particulate matter is 0.5 mm, as larger particles are prone to rebound from the electrode, and preferably not more than 10% of the weight of the matter is provided by particles having a particle size of 0.1 mm or less, as higher amounts of such particles may result in dust and/or segregation problems to some extent. By using the particulate matter conforming to these particle size limitations the achievement of an effective protective coating is facilitated: even the smaller particles are not too subject to being carried away in the strong convection currents prevailing near hot electrodes and even the larger particles have little tendency to rebound from the hot electrode.

The particulate matter comprising the particles in which both the essential ingredients are present is preferably made in accordance with the invention by heating together a mixture of the ingredients to fuse the graphite-wetting material at least partially and to cause it to adhere to the refractory filler to form a coherent mass e.g. in the form of a block, plate, strip or rod and then crushing this mass and sieving it to obtain the desired particle sizes.

Another way of making the particulate matter comprises pressing a simple mixture of the ingredients by using a heated roller or rollers such that during the pressing the matrix material fuses at least partially and adheres to the refractory filler. The pressed product is then crushed and sieved to give the desired particle sizes. If desired, the hot, pressed product may be subjected to thermal shock e.g. by a blast of cold gas in order to fracture it or at least weaken it to aid the subsequent crushing.

Yet another way of making the particulate matter is to cause a simple mixture of the ingredients to pass through a heated zone where the matrix material fuses at least partially and adheres to the refractory filler to form agglomerated particles.

The agglomerated particles pass into a cooler zone where the matrix material becomes solid again and thus the agglomerated particles formed in the heated zone do not adhere to each other. If the agglomerated particles as formed are not of the desired size, they may be subjected to thermal shock to fracture or at least weaken them to aid subsequent crushing.

The invention is illustrated by the following Example.

EXAMPLE

Two mixtures of boric oxide and silicon carbide were made, one (mixture A) containing 40% by weight of boric oxide and 60% of silicon carbide and the other (mixture B) 35% by weight of boric oxide and 65% of silicon carbide.

The two mixtures were heated in trays at a temperature of 450° C. for 1 hour and yielded hard plates on cooling. The plates were then separately crushed and the crushed matter sieved in each case to provide compositions containing 50% by weight of particles having sizes less than 0.5 mm but greater than 0.25 mm and 50% by weight of particles having sizes not greater than 0.25 mm but greater than 0.125 mm. Substantially all of each of the compositions was composed of particles comprising both boric oxide and silicon carbide.

Two graphite electrodes X and Y, of 550 mm diameter were removed from an electric arc steel-making furnace immediately after a period of use and shortly after removal the compositions derived from mixtures A and B were applied in bands 150 mm wide. The application was effected by fluidising the compositions in a relatively small volume of air and spraying the fluidised matter on to the electrode.

After the electrodes had cooled slightly the bands were inspected and those derived from mixture A appeared to have a very hard, glazed, impermeable surface whilst those derived from mixture B had an unglazed, more porous appearance. Some hours later the electrodes were returned to the furnace and put into service.

After 100 minutes in the furnace electrode Y was removed (and replaced by another electrode) and examined when cool. The band derived from mixture A was 1–2 mm thick and adhered very well. The band derived from mixture B was 1 mm thick and adhered well. Comparison with uncoated areas of the electrode showed that the bands were protecting the underlying graphite.

Electrode X was removed from the furnace after 6.5 hours, at the end of the cast, and examined when cool. The positions of both the bands could still be detected although much of the matter had disappeared, especially towards the hotter end of the electrode. In the case of the band derived from mixture A, graphite in the band area stood proud of the surrounding unprotected graphite by up to 10–12 mm whilst in the case of the band derived from mixture B the protected graphite stood proud by up to 5 mm.

The above Example shows that the special type of particulate matter in question in the present invention enables graphite electrodes to be effectively protected. Little of the matter applied is wasted and pollution is minimal. Moreover, the use of preformed boards of protection material is avoided in the invention as is the need for the relatively complicated application equipment used for such boards.

We claim:

1. Particulate matter for the protection of a graphite electrode of an electric arc furnace to reduce loss of graphite by oxidation from the side of the electrode, said matter comprising particles each containing both a graphite-wetting fusible matrix material having a melting point below 1000° C. and a refractory filler, said particles comprising 30 to 80% by weight of refractory filler and 20 to 70% by weight of graphite-wetting fusible matrix material, the maximum particle size of the particles of the particulate matter being 0.5 mm and not more than 10% by weight of the matter comprising particles having a particle size of 0.1 mm or less.

2. Particulate matter according to claim 1 comprising at least 70% by weight of particles each containing both a graphite-wetting fusible matrix material and a refractory filler.

3. Particulate matter according to claim 1 comprising at least 90% by weight of particles each containing both a graphite-wetting fusible matrix material and a refractory filler.

4. Particulate matter according to claim 1 wherein the graphite-wetting fusible matrix material is a boron compound.

5. Particulate matter according to claim 1 in which the graphite-wetting matrix material is a boron-containing glass.

6. Particulate matter according to claim 1 wherein the refractory filler is selected from the group consisting of refractory metals, refractory oxides, aluminosilicates, carbides, nitrides, silicides and borides.

7. Particulate matter according to claim 1 wherein the minimum size of the particles is 0.125 mm.

8. A process for the production of particulate matter for the protection of a graphite electrode of an arc furnace which comprises heating a mixture of a graphite-wetting fusible matrix material and a refractory filler to fuse said graphite-wetting material at least partially and to cause it to adhere to said refractory filler to form a coherent mass and then crushing the said coherent mass and sieving it to obtain the desired particle size, the resulting particles comprising 30 to 80% by weight of refractory filler and 20 to 70% by weight of graphite-wetting fusible matrix material, the maximum particle size of the particles of the particulate matter being 0.5 mm and not more than 10% by weight of the matter comprising particles having a particle size of 0.1 mm or less.

9. A process for the production of particulate matter for the protection of a graphite electrode of an arc furnace which comprises passing a mixture of a graphite-wetting fusible matrix material and a refractory filler through a heated zone where the said graphite-wetting material fuses at least partially and adheres to the said refractory filler to form agglomerated particles and passing the said agglomerated particles into a cooler zone to solidify the said graphite-wetting material whereby the said agglomerated particles do not adhere to each other and if necessary crushing the agglomerated particles and sieving them to give the desired particle size.

10. A method of protecting a graphite electrode of an electric arc furnace to reduce loss of graphite by oxidation from the side of the electrode comprising contacting the side of the electrode with particulate matter comprising particles containing both a graphite-wetting fusible matrix material and a refractory filler whilst the electrode is at an elevated temperature such that said matrix material fuses at least partially and a protective coating comprising said refractory filler in a matrix of said matrix material is formed on the side of electrode.

11. A process for the production of particulate matter for the protection of a graphite electrode of an arc furnace which comprises heating a mixture of a graphite-wetting fusible matrix material and a refractory filler to fuse said graphite-wetting material at least partially and to cause it to adhere to said refractory filler to form a coherent mass and then crushing the said coherent mass and sieving it to obtain the desired particle size, the heating being effected by pressing the mixture by use of at least one heated roller.

* * * * *